United States Patent
Lee et al.

(10) Patent No.: US 11,972,388 B2
(45) Date of Patent: Apr. 30, 2024

(54) TECHNIQUES FOR REAL-TIME RESPONSE STRATEGIES IN A SUPPLY CHAIN

(71) Applicant: Cox Communications, Inc., Atlanta, GA (US)

(72) Inventors: David Lee, Atlanta, GA (US); Jacob Mapel, Atlanta, GA (US); Hunter Shinn, Atlanta, GA (US); Zach Ritter, Atlanta, GA (US); Alexis Cohen, Atlanta, GA (US); Amanda Marotti, Atlanta, GA (US); Barbara Hernandez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/658,580

(22) Filed: Apr. 8, 2022

(65) Prior Publication Data
US 2023/0325759 A1    Oct. 12, 2023

(51) Int. Cl.
  *G06Q 10/0832*    (2023.01)
  *G06Q 10/0833*    (2023.01)
(52) U.S. Cl.
  CPC ..... *G06Q 10/0832* (2013.01); *G06Q 10/0833* (2013.01)
(58) Field of Classification Search
  CPC .................. G06Q 10/0832; G06Q 10/0833
  See application file for complete search history.

(56) References Cited

U.S. PATENT DOCUMENTS

| | | | |
|---|---|---|---|
| 2009/0015400 A1* | 1/2009 | Breed | G07C 9/28 340/539.22 |
| 2009/0313072 A1* | 12/2009 | Balok | G06Q 10/0631 705/333 |
| 2014/0232519 A1* | 8/2014 | Allen | G06Q 30/0283 340/5.9 |
| 2015/0120597 A1* | 4/2015 | Dertadian | F25D 3/08 705/332 |
| 2016/0239790 A1* | 8/2016 | Burch, V. | G06Q 10/083 |
| 2021/0287168 A1* | 9/2021 | Arora | G06Q 10/0832 |
| 2022/0327476 A1* | 10/2022 | Shanmugavelayudam | G06Q 10/0832 |

OTHER PUBLICATIONS

Hetal Bhavsar, "A Comparative Study of Training Algorithms for Supervised Machine Learning", 2012, p. 74-76 (Year: 2012).*

* cited by examiner

*Primary Examiner* — Ibrahim N El-Bathy
(74) *Attorney, Agent, or Firm* — Eversheds Sutherland (US) LLP

(57) ABSTRACT

This disclosure describes systems, methods, and devices related to providing real-time response strategies in a supply chain. A system may be configured to obtain first sensor data collected from a first tracking device associated with a first asset, determine a first set of external data associated with the first asset, determine, based at least in part on the first sensor data and the first set of external data, a probability of failure and a mode of failure, and responsive to a determination that the probability of failure exceeds a failure threshold: determine a mitigation for the mode of failure that is available based at least in part on the first sensor data and the first set of external data, determine one or more real-world actions corresponding to the mitigation that, if performed, remediate the mode of failure, and cause the one or more real-world actions to be performed.

13 Claims, 11 Drawing Sheets

TECHNIQUES FOR REAL-TIME RESPONSE STRATEGIES IN A SUPPLY CHAIN

TECHNICAL FIELD

This disclosure generally relates to systems and methods for providing real-time response strategies in a supply chain. Techniques described herein may utilize prior success and/or failure events to determine appropriate strategies.

BACKGROUND

In the context of supply chain management, there are many challenges involved in the successful delivery of assets. Delivery failures may manifest in a wide variety of ways. For example, spoilage, loss, and on-time delivery are problems that organizations in a supply chain may experience, resulting in costly losses. There are many challenges involved in understanding why and how delivery of assets is successful or fails. A package may be stolen in transit; a package may include assets that are temperature sensitive such that the assets may experience spoilage if they are subject to excess heat or cold for a prolonged duration of time. It is often difficult to not only detect these problems, but also mitigate them. Accordingly, there is need in supply chain management to improve asset management through a supply chain and inventory management, but there are many challenges involved therein.

Figure 1:
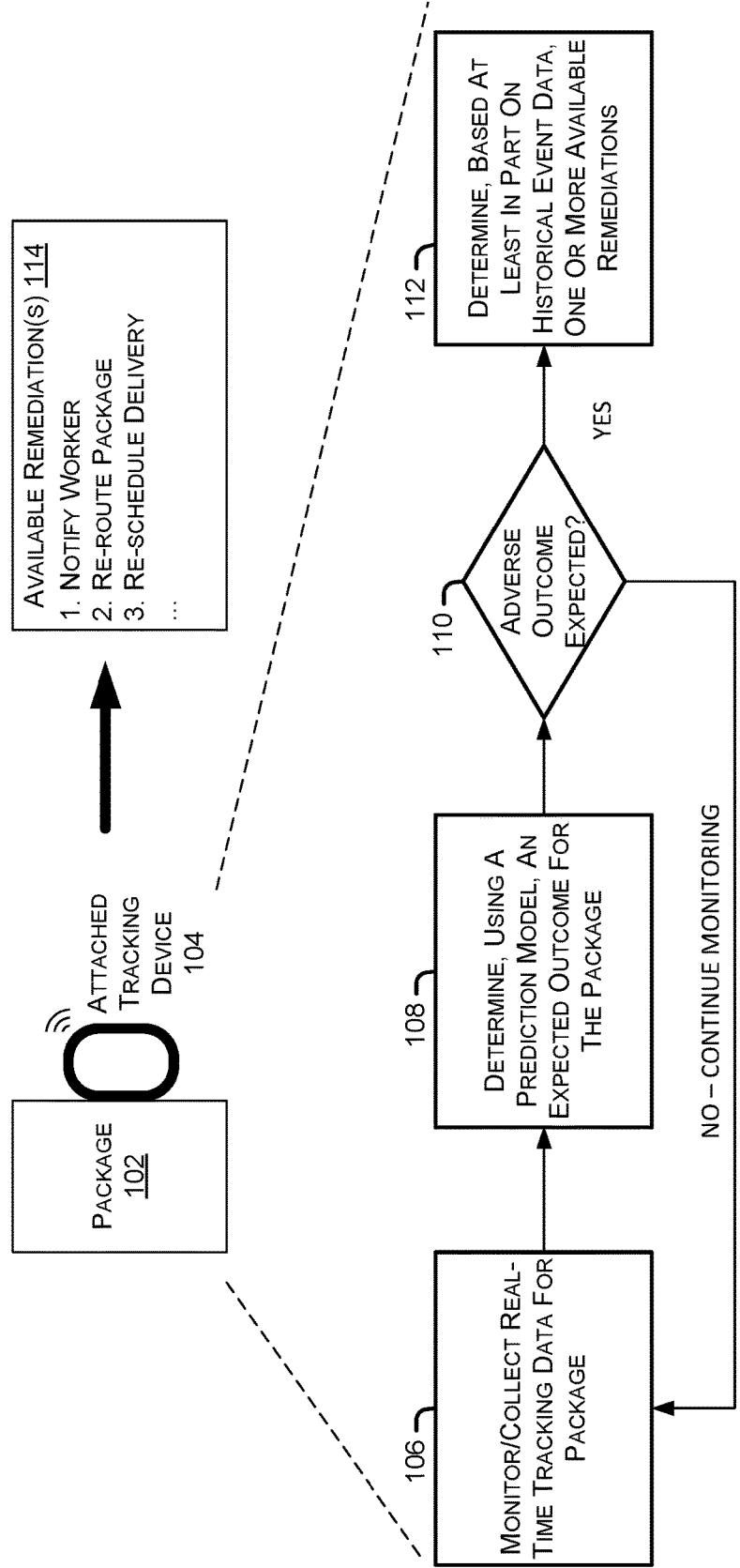
FIG. 1 illustrates an example environment in which real-time response strategies may be implemented, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

In the context of supply chain management, there may be a need to provide systems and methods for providing real-time response strategies in a supply chain based on prior success and fail events. Techniques described herein may be used to prescribe certain mitigations that can be performed and to deliver specific instructions to specific individuals or system to perform readily-available mitigations within a specific environment.

There are many challenging problems within the context of supply chain management and successful management of assets as they make their way through a supply chain. Spoilage, loss, theft, and on-time delivery are just a few illustrative examples of expensive problems that organizations may encounter in real-world supply chains. Techniques described herein may be used to reduce these problems by providing real-time asset intervention that analyzes the risk of various failures and determining appropriate interventions for the specific environment of an asset in the supply chain. In at least one embodiment, event data for assets that make their way through a supply chain are recorded to a database. This database may serve as a corpus of training data for a prediction model that can be used to predict or infer the probability of failure for subsequent assets making their way through the supply chain. The event data collected may include sensor data from an asset tracking device that is attached to the package external data such as weather, traffic data, or presence data. A prediction model may be trained to determine the probability of various modes of failure, such as spoilage, loss, theft, and on-time delivery, which should be construed merely as illustrative examples that do not limit the scope of the disclosure. Once a prediction model is trained on historical package data, it may be used to monitor the status of packages and assets in real time.

Generally speaking, a desired goal in a supply chain involves the shipment of an asset or package through a supply chain, which may involve the movement of the asset through various locations and/or through various parties. In a supply chain, there may be various parties that are involved in the handling of an asset or package, and not all parties may have real-time visibility into the status of the asset or package. This level of visibility may, in some cases, be undesirable—for example, there may be benefits to providing warehouse workers with visibility into the contents of a package, such as in the case where the package contains lettuce, produce, or other goods that are subject to spoilage in high temperatures, but doing so may introduce risks that outweigh the benefits. As a second example, consider the case in which the package includes high-value electronics such as cell phones or gaming consoles that can be subject to theft.

Real-time tracking data for a package or asset may be collected on a continuous, periodic, or interment basis. A prediction model may use the real-time tracking data and/or real-time external data such as traffic or weather conditions to determine a predicted outcome for a package. A predicted outcome may be represented as the probability that the package or asset experiences one or more types of failure. For example, the prediction model may collect temperature information for a package and traffic information to determine whether the package is expected to arrive at a destination before the package exceeds a temperature specification. Packages may be sensitive to temperature, shock, time, or other variables that may make it so that receiving a package out of specification renders the package unusable for its intended purpose. For example, medical supplies may be shipped through a supply chain in a cold-temperature container or freezer. The temperature of the medical supplies may be monitored, and if it is detected that the temperature of the containers is rising and may soon be out of specification—for example, due to loss of power, delays, excess exposure to direct sunlight, storage in an inappropriate area, and so forth—the probability of failure for the package generated by the prediction model may rise.

A remediation engine may be used to determine one or more available remediation. For example, given the state of a present shipment with an unacceptably high probability of failure, the remediation may be used to identify one or more available remediations. Available remediations may be determined based on historical events that have occurred in states that are similar to the state of the current package or asset. For example, if a temperature-sensitive asset is delivered to a warehouse and is subject to heating that would, if unmitigated, result in excess heat that would damage the asset, an available remediation could be to move the asset into a freezer or cold temperature region based on historical event data. The historical event data may indicate the presence of a freezer nearby, or that certain regions of a warehouse are cooler than others, and so forth. The remediation engine may be used to determine more potential remediations. The potential remediations may be tested against the prediction model to determine which of the available remediations are suitable for mitigating the predicted failure and a suitable remediation may be selected.

A real-world action for mitigating the failure may be determined. For example, a mitigation may be to reduce the temperature of an asset, and the corresponding real-world action may be for a worker to move the asset from a first warehouse location (e.g., located at a first area, aisle, and bay) to a second warehouse location (e.g., located at a second area, aisle, and bay).

FIG. 1 illustrates an example environment 100 in which real-time response strategies may be implemented, in accordance with one or more embodiments of the present disclosure.

Package 102 may refer to any suitable physical asset that may be transported through a supply chain. Package 102 may include various types of goods. Package 102 may include electronics, food, medical supplies, and so forth. Package 102 may be transported across great physical distances—for example, from a manufacturing facility to an end user. While in transportation, in storage, etc., the package 102 may be subject to various environmental events or conditions that may result in the package being damaged, lost, or otherwise rendered unsatisfactory for its intended use. In some cases, a single tracking device may be used to track multiple packages. In some cases, a single package is monitored using multiple tracking devices. In various embodiments, multiple packages are shipped together, which allows for better determination of failures—for example, if N packages are being made together and only of them is overheating, it may suggest that the problem is local to a specific package. However, if all N packages are subject to overheating, it may indicate an environmental problem.

An attached tracking device 104 may be an Internet-of-Things (IoT) embedded device that includes various sensors to collect metrics about the package while it is in transit. Examples of sensors may include GPS receivers, temperature sensors, shock and impact sensors, clocks, and more. The tracking device may collect metrics at regular intervals specified by an authorized user and transmit the collected metrics to the organization's computer network. These metrics may be used to determine whether the package is subject to an adverse condition. The tracking device may be attached to package 102 in any suitable manner. The attached tracking device may be adhered to the side of the package 102, included inside the package 102, and so on.

Techniques described herein may relate to the use of a tracking device (e.g., as depicted in FIG. 1) to provide real-time response strategies in a supply chain based on prior success and fail events. In at least one embodiment, an attached tracking device is used to monitor and/or collect real-time tracking data for package at step 106. The tracking device may be in communication with a system implemented as a server or cloud provider that that stores the tracking data in a database or other suitable data store. The system may be operable to analyze the status of the package in real-time, determine when a package is subject to a high likelihood or probability of failure, determine mitigations, and cause downstream action to be taken to mitigate an expected failure.

In various embodiments, the system may collect external data in addition to the tracking data. External data may refer to data that is collected from sources other than sensors of the tracking device. For example, traffic data or weather data may be external data that is used by a prediction model to determine a probability of failure. Traffic data may, for example, be used to determine estimates for how long a package is in transit and whether the package is expected to be delivered on time, within specifications, stolen, subject to loss, or other possible adverse outcome.

In various embodiments, the system determines, using a prediction model, an expected outcome for the package at step 108. The prediction model may be generated using historical event data of successes and failures. For example, historical event data may trace the condition or state of historical packages as they make their way through a supply chain, along with information regarding the ultimate outcome of those packages as a success or failure. In the case of a package including temperature-sensitive assets, such as produce, the success may rely on the assets being delivered within a temperature specification. As an example, certain produce may be considered spoiled if they are out of temperature specification for a prolonged duration of time. As a second example, medical supplies such as vaccines may be stored in a freezer, with dry ice or other cooling means to ensure that they remain below a specific temperature. If the temperature tolerances for the medical supplies are exceeded, then the supplies may be no longer usable. One such example is for certain COVID-19 vaccines, which must be transported and/or stored within a certain temperature specification (e.g., between −15 and −50 degrees Celsius). If the temperature specification is exceeded, then the vaccines may be rendered unusable.

The prediction model may be trained to determine, based on the current state of package 102, a probability or likelihood of various modes of failures or for any failure in general. For example, if a truck carrying package 102 is subject to excessively bad traffic conditions and package 102 includes a limited supply of coolant for temperature-sensitive assets, then the prediction model may determine the probability that the package arrives at a facility with a freezer prior to the coolant running out and/or the temperature of the asset being out of specification. The prediction model may be implemented in any suitable manner. For example, the prediction model may be a machine-learning model.

The system may use the model to determine whether an adverse outcome is expected. In various embodiments, the prediction model outputs a probability of failure and at step 110 and compares the probability against a threshold probability. The threshold may refer to an acceptable probability of failure. It is generally considered impractical or impossible to ensure a 100% probability of success. Example thresholds may include tolerances allowing for 10% failure, 1% failure, 0.1% failure, 10-2% failure, 10-3% failure, 10-4% failure, 10-5% failure, and so forth.

If the probability of failure is less than the threshold, then the system may return to step 106 and continuously collect real-time tracking data and update the probability of failure based on the updated state of the package. However, if the probability of failure exceeds the threshold, then the system may determine, based at least in part on historical event data, one or more available remediations at step 112. A remediation may refer to change in state that would reduce the probability of failure. In various embodiments, various potential mitigations may be possible. For example, if an unexpected rise in temperature is detected in a temperature-sensitive package, one possible mitigation may be to provide additional cooling from a secondary source. A second possible mitigation may involve re-routing the package to a closer warehouse that has a freezer where the package may be delayed. While delays are typically undesirable, a delay may be considered an acceptable alternative to having the temperature-sensitive package go out of specification in a manner that results in spoilage or loss of assets.

Available remediations 114 depicted in FIG. 1 may refer to one or more real-world actions that may be undertaken to reduce the probability of failure. For example, if excess traffic is detected and it is predicted that coolant for a temperature-sensitive package will run out before the package arrives at its intended destination, then various remediations may be available. As a first example, if the truck carrying the temperature-sensitive package includes extra coolant, then the driver or worker may be notified—for example, via a text message or smartphone notification—to pull over to the side of the road and refill the coolant for the temperature-sensitive package before the temperature goes out of specification. As a second example, when no coolant is available, a remediation may involve the package being re-routed to a facility where additional coolant may be obtained. As a third example, if it is expected that nobody will be available at the intended destination to receive the temperature-sensitive package and store it in a freezer, the delivery of the package may be rescheduled.

Figure 2:
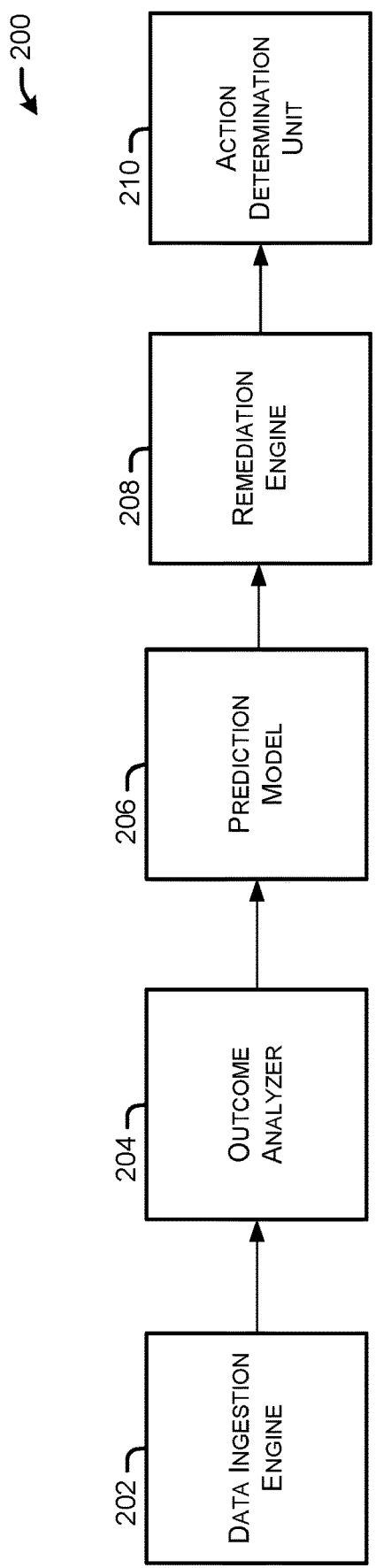
FIG. 2 illustrates an example environment depicting a computer-based architecture for implementing real-time response strategies, in accordance with one or more embodiments of the present disclosure.

FIG. 2 illustrates an example environment 200 depicting a computer-based architecture for implementing real-time response strategies, in accordance with one or more embodiments of the present disclosure.

Data ingestion engine 202 may refer to hardware, software, or a combination thereof that collects data that is used by downstream components. Data ingestion engine 202 may be responsible for storing and providing access to tracking data for assets as they move through a supply chain environment. In some embodiments, data ingestion engine 202 is implemented using a database system to store tracking data. Tracking data may include various information about a package collected from on board sensors, such as GPS receivers, temperature sensors, shock and impact sensors, clocks, and more. In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system, such as a system implemented in the context of environment 200.

Outcome analyzer 204 may refer to hardware, software, or a combination thereof that analyzes historical event data obtained by the data ingestion engine 202 and assigns outcome classifications. The outcome analyzer may determine the status of historical events algorithmically. The outcome analyzer may be used to reverse engineer where the point of failure occurred. For example, a package containing physically fragile assets such as glass or other materials that are shock-sensitive may be delivered to a destination where it is inspected and then determined to be defective, perhaps due to physical shocks experienced during transit. The outcome analyzer may be used to determine the status of the package. For example, it may be confirmed that at $t_0$ when the package was shipped that the asset was in good condition, but that at time of delivery $t_d$ it was damaged. Shock sensors of an attached tracking device may be used to track the status of the package over time and outcome analyzer may be used to determine whether a first shock experienced at time $t_1$ wherein $t_1<t_d$ was likely to have damaged the package, a second shock experience at $t_2$ wherein $t_1<t_2<t_d$ was likely to have damaged the package, and so forth. In this way, information regarding the in-flight status of a package delivery may be determined and may be used by downstream system to determine when a failure of an in-transit shipment is likely to occur and/or mitigations that may be taken to reduce the likelihood of such failures.

Prediction model 206 may refer to hardware, software, or a combination thereof that generates predictions or inferences of a probability of failure for a package or asset given a particular state. Prediction model 206 may be implemented in any suitable manner, for example, as a machine-learning model, as a heuristics engine, as a rules-based system, and so forth. In various embodiments, prediction model 206 uses historical event data of successes and failures—for example, as determined by outcome analyzer 204—to determine whether a particular package or group of packages with a common trait are expected to fail at a certain rate, a mode of failure, and so forth. Different modes of failure may include on-time delivery (e.g., in the case of time-sensitive deliveries such as organ transplants or blood transfusions, the patient may be required to receive the assets by a certain delivery time and there may be little or no tolerance for late deliveries), spoilage, theft, loss, and so forth. A prediction model may receive, as inputs, real-time tracking data of an asset and real-time external data such as weather or traffic patterns and generate, as an output, a probability of failure and/or a mode of failure. The probability of failure may refer to the probability of a particular mode of failure or may refer to the overall likelihood of failure due to any reason.

Remediation engine 208 may refer to hardware, software, or a combination thereof that does stuff. Remediation engine 208 may refer to a component that is used to determine which circumstance would need to change in order for the probability of failure to improve. Remediation engine may rely on historical event data to analyze historical trends and data to identify what changes in states would, under a given set of circumstances, result in an improvement. For example, historical event data may indicate that when a particular type of temperature-sensitive package (e.g., medical supplies) is left on a loading/unloading dock for a prolonged duration of time $t_m > t_n$, that it results in spoilage of the supplies. Further, successful events may indicate that packages that were moved to a nearby freezer before $t_n$, resulted in successful deliveries that were not subject to spoilage. Remediation engine may use this historical event data to determine location-specific information that at this particular loading/unloading dock, an available remediation is cooling, because historically, it was possible to have packages moved from the loading/unloading dock to the nearby freezer. Conversely, other loading/unloading docks may not have nearby freezers, meaning that the remediation engine may, for a second warehouse, not identify cooling as an available remediation if there is not any historical data to indicate such an option is available.

In various embodiments, prediction model 206 may be used to detect when a remediation should be taken and may be used in the selection of a remediation. For example, if a package is in state $s_0$ and it is determined that the probability of failure $p_0$ in state $s_0$ exceeds a threshold $p_{thresh}$, then the remediation engine 208 may determine one or more available remediations. For the sake of example, consider remediations $m_1$, $m_2$, and $m_3$ are available. Updated states $s_1$, $s_2$, and $s_3$ may be determined based on the resulting states expected from applying remediations $m_1$, $m_2$, and $m_3$, respectively. The updated states $s_1$, $s_2$, and $s_3$ may be provided to prediction model 206 to determine updated probabilities $p_1$, $p_2$, and $p_3$ respectively. The lowest probability of failure among the available remediations may be selected, in some embodiments. In some cases, additional factors may be used to select among several candidate remediations that result in the failure probability falling below the threshold—for example, if two different remediations would both result in the failure probability falling below the threshold wherein one requires human intervention and the other can be performed programmatically, the programmatic remediation may be selected as to reduce the inconvenience to the human that would be required to intervene in the former remediation option.

Action determination unit 210 may refer to hardware, software, or a combination thereof that determines one or more actions that should be performed to cause one or more remediations to be performed. For example, in some cases, an applicable remediation may involve moving a package from one temperature region to another temperature region (e.g., from a loading dock into a freezer). The real-world action that would realize this change may involve providing instructions to a warehouse worker a notification—such as a text message notification or an electronic message on a warehouse computer system—with instructions to the warehouse worker to move the package in the prescribed manner.

Figure 3:
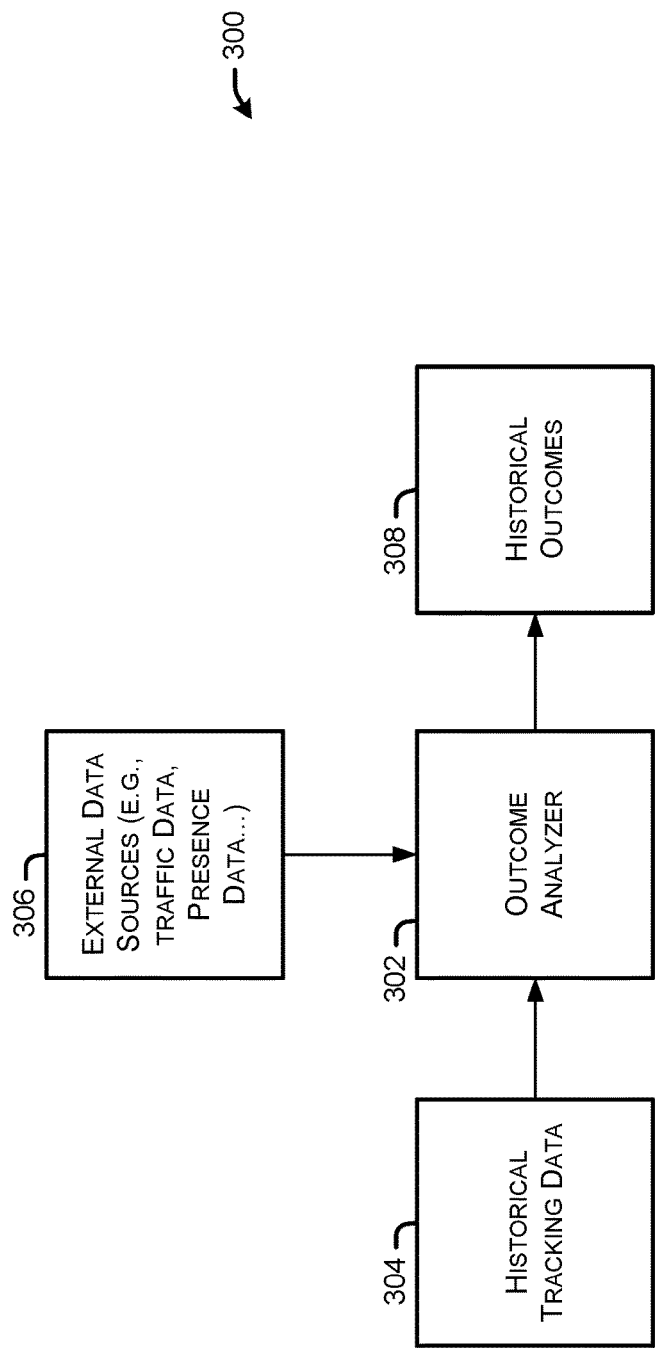
FIG. 3 illustrates an example environment in which an outcome analyzer may be utilized, in accordance with one or more embodiments of the present disclosure.

FIG. 3 illustrates an example environment 300 in which an outcome analyzer 302 may be utilized, in accordance with one or more embodiments of the present disclosure.

Outcome analyzer 302 may refer to hardware, software, or a combination thereof that analyzes historical event data obtained by the data ingestion engine (e.g., as described in connection with FIG. 2) and assigns outcome classifications. Outcome analyzer 302 may receive historical tracking data 304 and external data sources 306 as inputs and such inputs may be used to determine historical outcomes 308. The outcome analyzer 302 may determine the status of historical events algorithmically.

Outcome analyzer 302 may incorporate historical tracking data 304 and/or external data sources 306 to determine historical outcomes of packages being transported through a supply chain environment. In this way, outcome analyzer 302 may be used to perform post hoc analysis of package deliveries. Historical tracking data 304 may refer to sensor data collected from previous shipments that have already been completed and in which the ultimate outcome of success or failure has already been determined. External data sources may refer to external data that has been collected contemporaneous or in connection with the historical tracking data. For example, traffic or weather data or presence data of employees, workers, contractors, or other human resources available within a supply chain environment.

Outcome analyzer 302 may be used to reverse engineer where the point of failure occurred. For example, a package containing physically fragile assets such as glass or other materials that are shock-sensitive may be delivered to a destination where it is inspected and then determined to be defective, perhaps due to physical shocks experienced during transit. The outcome analyzer may be used to determine the status of the package. For example, it may be confirmed that at $t_0$ when the package was shipped that the asset was in good condition, but that at time of delivery $t_d$ it was damaged. Shock sensors of an attached tracking device may be used to track the status of the package over time and outcome analyzer may be used to determine whether a first shock experienced at time $t_1$ wherein $t_1 < t_d$ was likely to have damaged the package, a second shock experience at $t_2$ wherein $t_1 < t_2 < t_d$ was likely to have damaged the package, and so forth. In this way, information regarding the in-flight status of a package delivery may be determined and may be used by downstream system to determine when a failure of an in-transit shipment is likely to occur and/or mitigations that may be taken to reduce the likelihood of such failures.

Figure 4:
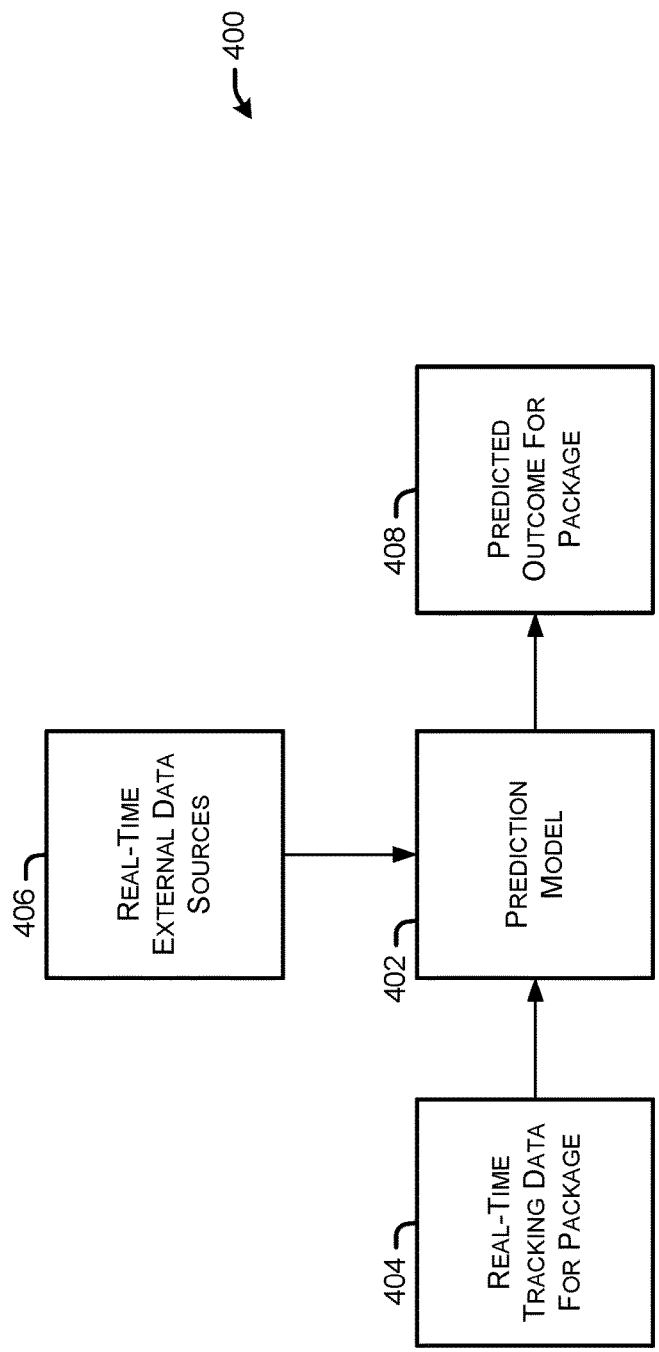
FIG. 4 illustrates an example environment in which a prediction model may be utilized, in accordance with one or more embodiments of the present disclosure.

FIG. 4 illustrates an example environment 400 in which a prediction model may be utilized, in accordance with one or more embodiments of the present disclosure.

Prediction model 402 may refer to hardware, software, or a combination thereof that generates predictions or inferences of a probability of failure for a package or asset given a particular state. Prediction model 402 may receive real-time tracking data 404 and real-time external data 406 as inputs and such inputs may be used to determine predicted outcome for package 408. In various embodiments, prediction model 402 is implemented as a machine-learning model that is trained on historical event data and historical outcomes. A training dataset for the machine-learning model may provide an input comprising state information to produce outputs corresponding to predicted likelihood of failure. The state information provided as input to the prediction model may comprise collected sensor data and external data (e.g., weather, traffic, presence data collected from sources external to a tracking device). The prediction model may be trained based on the classifications generated by an outcome analyzer that serves as the ground truth for the machine-learning training process. A trained prediction model may be used to generate predictions as to whether a package in transit is expected to fail and what the probability of failure is. The probability of failure may refer to the probability of a specific mode of failure or an overall rate of failure due to any reason whatsoever.

Prediction model 402 may be implemented in any suitable manner, for example, as a machine-learning model, as a heuristics engine, as a rules-based system, and so forth. In various embodiments, prediction model 402 uses historical event data of successes and failures—for example, as determined by outcome analyzer (e.g., as described in connection with FIG. 2)—to determine whether a particular package or group of packages with a common trait are expected to fail at a certain rate, a mode of failure, and so forth. Different modes of failure may include on-time delivery (e.g., in the case of time-sensitive deliveries such as organ transplants or blood transfusions, the patient may be required to receive the assets by a certain delivery time and there may be little or no tolerance for late deliveries), spoilage, theft, loss, and so forth. A prediction model 402 may receive, as inputs, real-time tracking data of an asset and real-time external data such as weather or traffic patterns and generate, as an output, a probability of failure and/or a mode of failure. The probability of failure may refer to the probability of a particular mode of failure or may refer to the overall likelihood of failure due to any reason.

Figure 5:
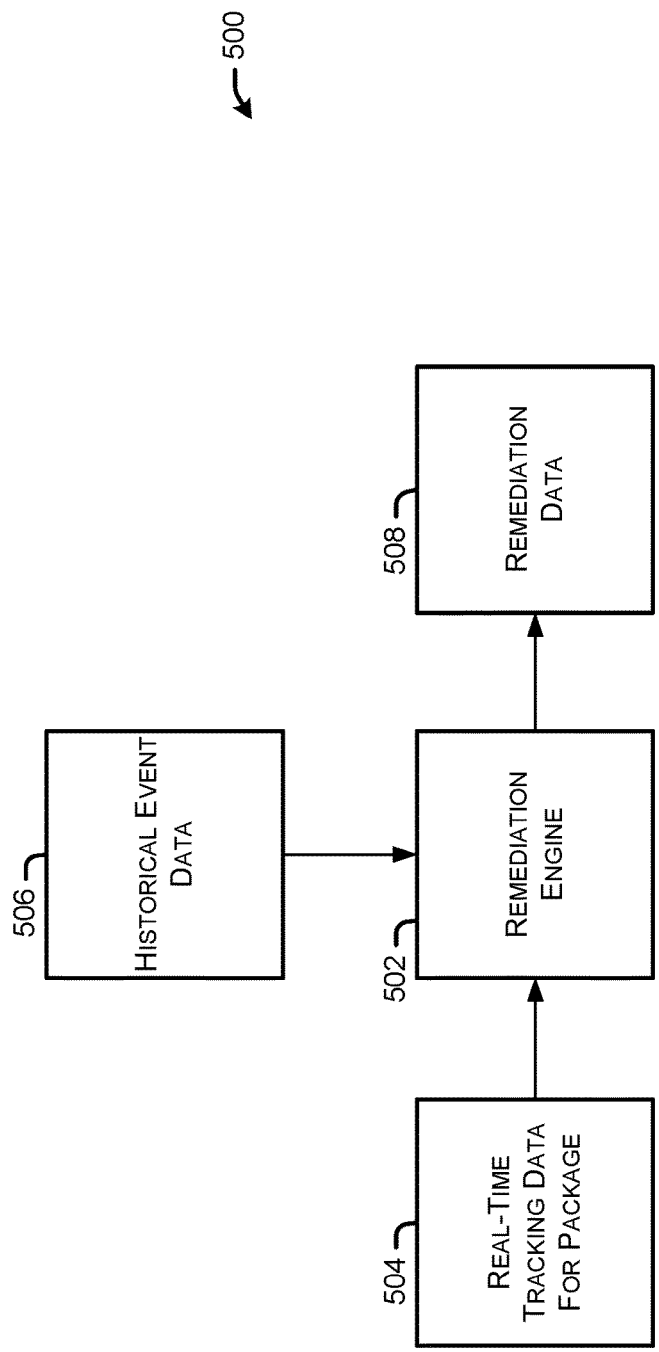
FIG. 5 illustrates an example environment in which a remediation engine may be utilized, in accordance with one or more embodiments of the present disclosure.

FIG. 5 illustrates an example environment 500 in which a remediation engine 502 may be utilized, in accordance with one or more embodiments of the present disclosure.

Remediation engine 502 may refer to hardware, software, or a combination thereof that does stuff. Remediation engine 502 may refer to a component that is used to determine which circumstance would need to change in order for the probability of failure to improve. Remediation engine 502 may receive real-time tracking data 504 and historical event data 506 as inputs and such inputs may be used to determine remediation data 508. Remediation engine may rely on historical event data to analyze historical trends and data to identify what changes in states would, under a given set of circumstances, result in an improvement. For example, historical event data may indicate that when a particular type of temperature-sensitive package (e.g., medical supplies) is left on a loading/unloading dock for a prolonged duration of time $t_m > t_n$, that it results in spoilage of the supplies. Further, successful events may indicate that packages that were moved to a nearby freezer before $t_n$, resulted in successful deliveries that were not subject to spoilage. Remediation engine may use this historical event data to determine location-specific information that at this particular loading/unloading dock, that an available remediation is cooling, because historically, it was possible to have packages moved from the loading/unloading dock to the nearby freezer. Conversely, other loading/unloading docks may not have nearby freezers, meaning that the remediation engine may, for a second warehouse, not identify cooling as an available remediation if there was not any historical data to indicate such an option is available.

In various embodiments, a prediction model (e.g., as depicted in FIG. 2) may be used to detect when a remediation should be taken and may be used in the selection of a remediation. For example, if a package is in state $s_0$ and it is determined that the probability of failure $p_0$ in state $s_0$ exceeds a threshold $p_{thresh}$, then the remediation engine 502 may determine one or more available remediations. For the sake of example, consider remediations $m_1$, $m_2$, and $m_3$ are available. Updated states $s_1$, $s_2$, and $s_3$ may be determined based on the resulting states expected from applying remediations $m_1$, $m_2$, and $m_3$, respectively. The updated states $s_1$, $s_2$, and $s_3$ may be provided to prediction model to determine updated probabilities $p_1$, $p_2$, and $p_3$ respectively. The lowest probability of failure among the available remediations may be selected, in some embodiments. In some cases, additional factors may be used to select among several candidate remediations that result in the failure probability falling below the threshold—for example, if two different remediations would both result in the failure probability falling below the threshold wherein one requires human intervention and the other can be performed programmatically, the programmatic remediation may be selected as to reduce the inconvenience to the human that would be required to intervene in the former remediation option.

Figure 6:
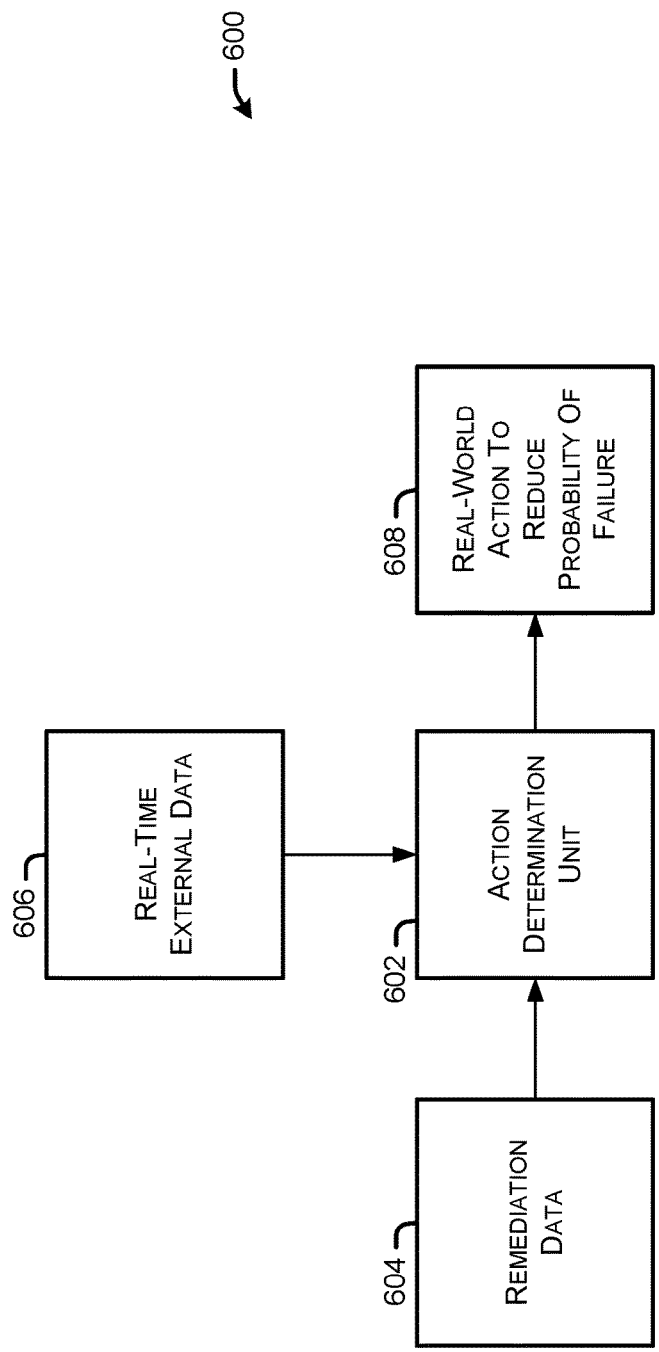
FIG. 6 illustrates an example environment in which an action determination unit may be utilized, in accordance with one or more embodiments of the present disclosure.

FIG. 6 illustrates an example environment 600 in an action determination unit may be utilized, in accordance with one or more embodiments of the present disclosure.

Action determination unit 602 may refer to hardware, software, or a combination thereof that determines one or more actions that should be performed to cause one or more remediations to be performed. Action determination unit 602 may receive remediation data 604 and real-time external data 606 as inputs and determine, based on such inputs, one or more real-world actions to reduce the probability of failure 608. For example, in some cases, an applicable remediation may involve moving a package from one temperature region to another temperature region (e.g., from a loading dock into a freezer). The real-world action that would realize this change may involve providing instructions to a warehouse worker a notification—such as a text message notification or an electronic message on a warehouse computer system—with instructions to the warehouse worker to move the package in the prescribed manner.

Figure 7:
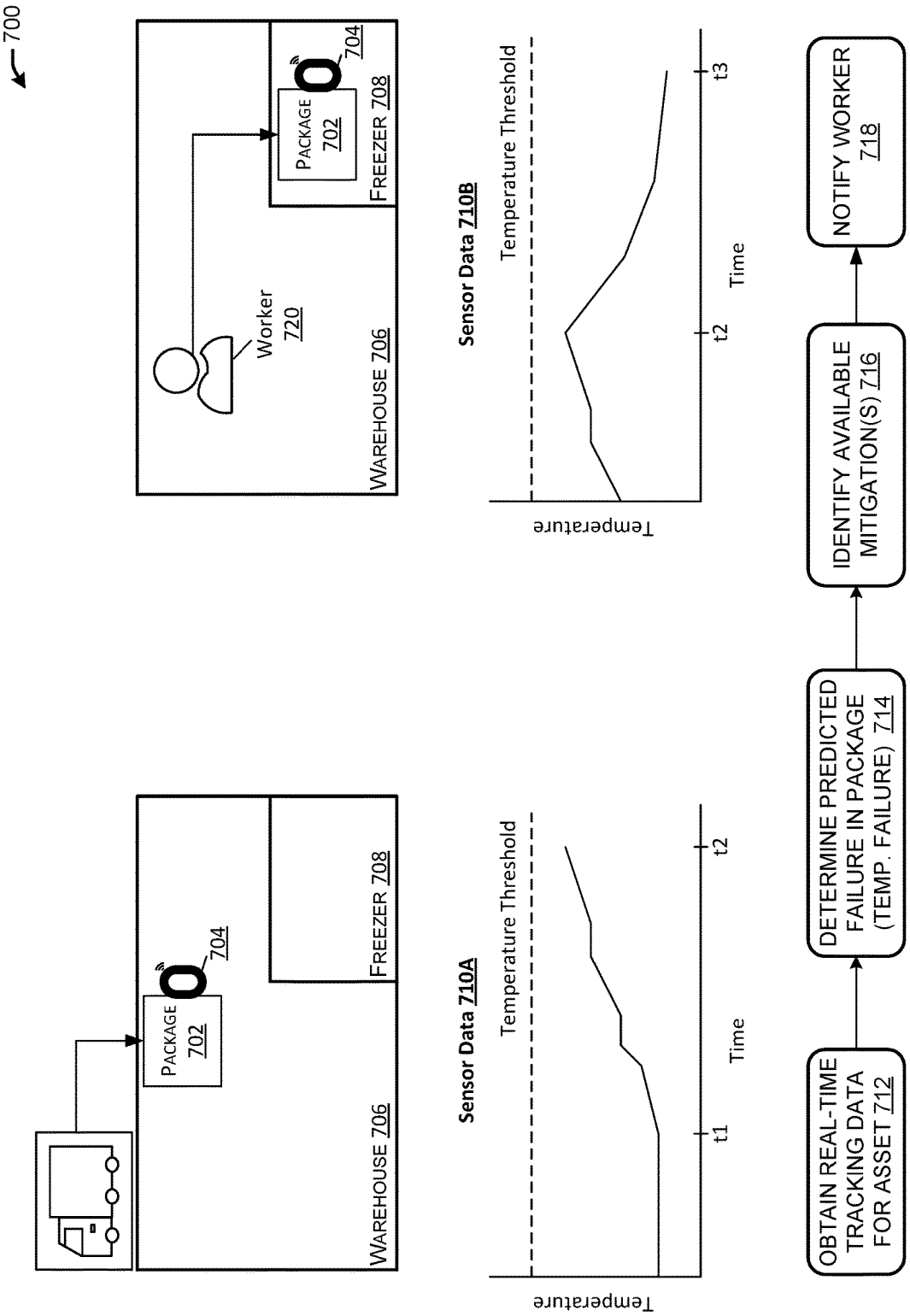
FIG. 7 illustrates an example environment in which a real-time response is determined based on prior success and failure events in a supply chain context, in accordance with one or more embodiments of the present disclosure.

FIG. 7 illustrates an example environment 700 in which a real-time response is determined based on prior success and failure events in a supply chain context, in accordance with one or more embodiments of the present disclosure.

In at least one embodiment, FIG. 7 depicts an illustration of a warehouse environment. Package 702 may be received at a warehouse loading/unloading dock at a first time t1 (e.g., as illustrated in the left-hand portion of FIG. 7). Package 702 may have an attached tracking device 704 that provides sensor data regarding the state of package 702. Examples of sensors may include GPS receivers, temperature sensors, shock and impact sensors, clocks, and more.

Package 702 may be received at a loading/unloading dock of warehouse 706. In various embodiments, warehouse 706 includes various temperature regions or zones. For the sake of illustration, warehouse 706 is depicted having a freezer 708 that can be used to store assets in a cold temperature area. While a freezer is depicted in FIG. 7, different regions within a warehouse (e.g., different bays) may have different temperature properties, which may be determined through the analysis of event data collected about the warehouse over time. Sensor data may be collected from tracking device 704. For example, at time t1, the package 702 may be unloaded from a refrigerated delivery truck and the temperature of the package may steadily rise towards the ambient temperature.

In various embodiments, real-time response is determined in the manner depicted in steps 712-718. In various embodiments, at step 712, real-time tracking data for asset is collected. The asset may refer to package 702. Sensor data 710A may be collected and monitored. At step 714, the system may determine a predicted failure in package (e.g., a temperature failure). As seen in sensor data 710A, the steady rise of the asset's temperature measurements towards the temperature threshold may cause a predicted failure to be flagged. For example, if the temperature were to continue to increase and read or exceed the temperature threshold indicated by the horizontal dashed line, then the asset may be damaged, spoiled, or otherwise rendered unusable.

At step 716, available mitigations may be identified. Historical event data may indicate the existence of a cold temperature region in warehouse 706. The event data may or may not indicate that the cold temperature region is a freezer. Regardless, it may be determined that an available mitigation is to move the package 702 from its current location to a nearby location within the freezer. The existence of this mitigation may be determined based on historical event data indicating that the movement of previous packages into the freezer 708 resulted in lower temperatures. At step 718, a worker 720 in warehouse 706 may be notified as an actionable response to the determined mitigation. Additional information, such as which workers are on shift, which workers are available or nearby to move the package, and so forth. In some embodiments, a worker is notified through a SMS notification message or mobile application. The notification may cause worker 720 to move the package 702 from the loading/unloading dock and into the freezer 708, thereby avoiding the predicted failure.

Figure 8:
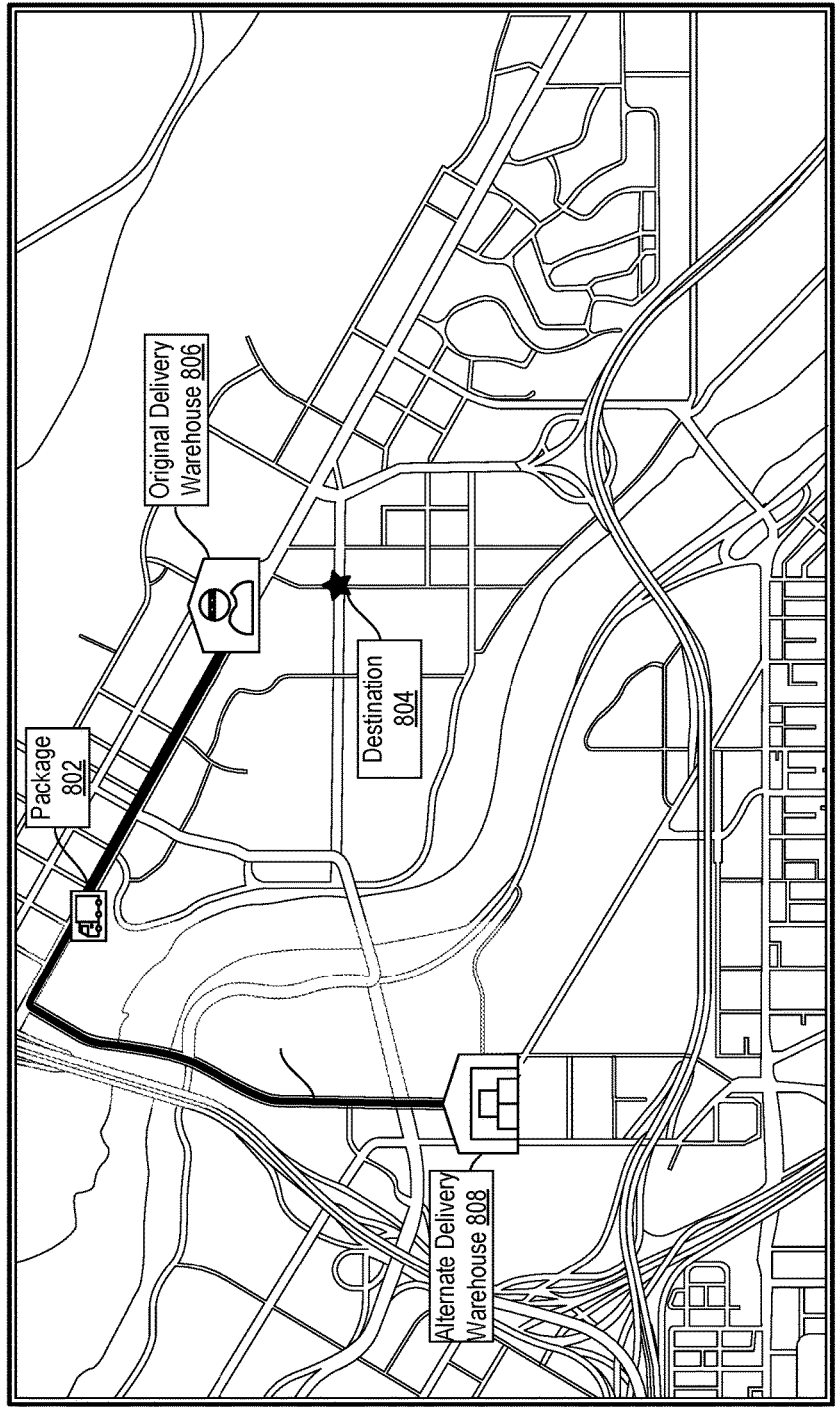
FIG. 8 illustrates an example environment in which a real-time response is determined based on prior success and failure events in a supply chain context, in accordance with one or more embodiments of the present disclosure.
Figure 8:
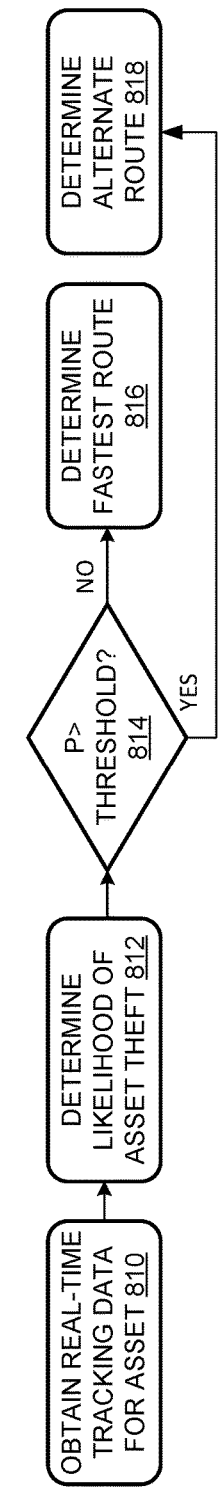

FIG. 8 illustrates an example environment 800 in which a real-time response is determined based on prior success and failure events in a supply chain context, in accordance with one or more embodiments of the present disclosure.

In at least one embodiment, FIG. 8 depicts a map view a package 802 in transit, a destination 804 for the package, an original delivery warehouse 806, and an alternative delivery warehouse 808 in the context of a map. In various embodiments, steps 810-818 are implemented in the context of a real-time response strategy. In various embodiments, package 802 is being delivered in the context of a supply chain and passes through various warehouses on its way to destination 804. At step 810, real-time tracking data for asset may be obtained. The asset tracking data may include the location of the asset. External data may include the location of supply chain warehouses, workers, and so forth. At step 812, the likelihood of asset theft is determined. In an illustrative example, the original delivery warehouse 806 may have had historical problems with theft. The theft may be a result of unscrupulous workers, security challenges, or various other causes. For example, historical data may be used to determine that certain times or certain days of the week are correlated with higher theft. This information may be used at least in part to determine a probability of failure p. At step 814, a determination is made whether p, the likelihood of theft, exceeds a threshold. If it does not, then step 816 may be used to determine the fastest route for delivering the package. For the sake of illustration, original delivery warehouse 806 is closest to destination 804 and may be used in the supply chain delivery for package 802. However, if p exceeds the threshold, then step 818 may be used to determine an alternative route. While alternative delivery warehouse 808 is farther away from destination 804, it may be selected to avoid the higher probability of theft in the original delivery warehouse 806.

Figure 9:
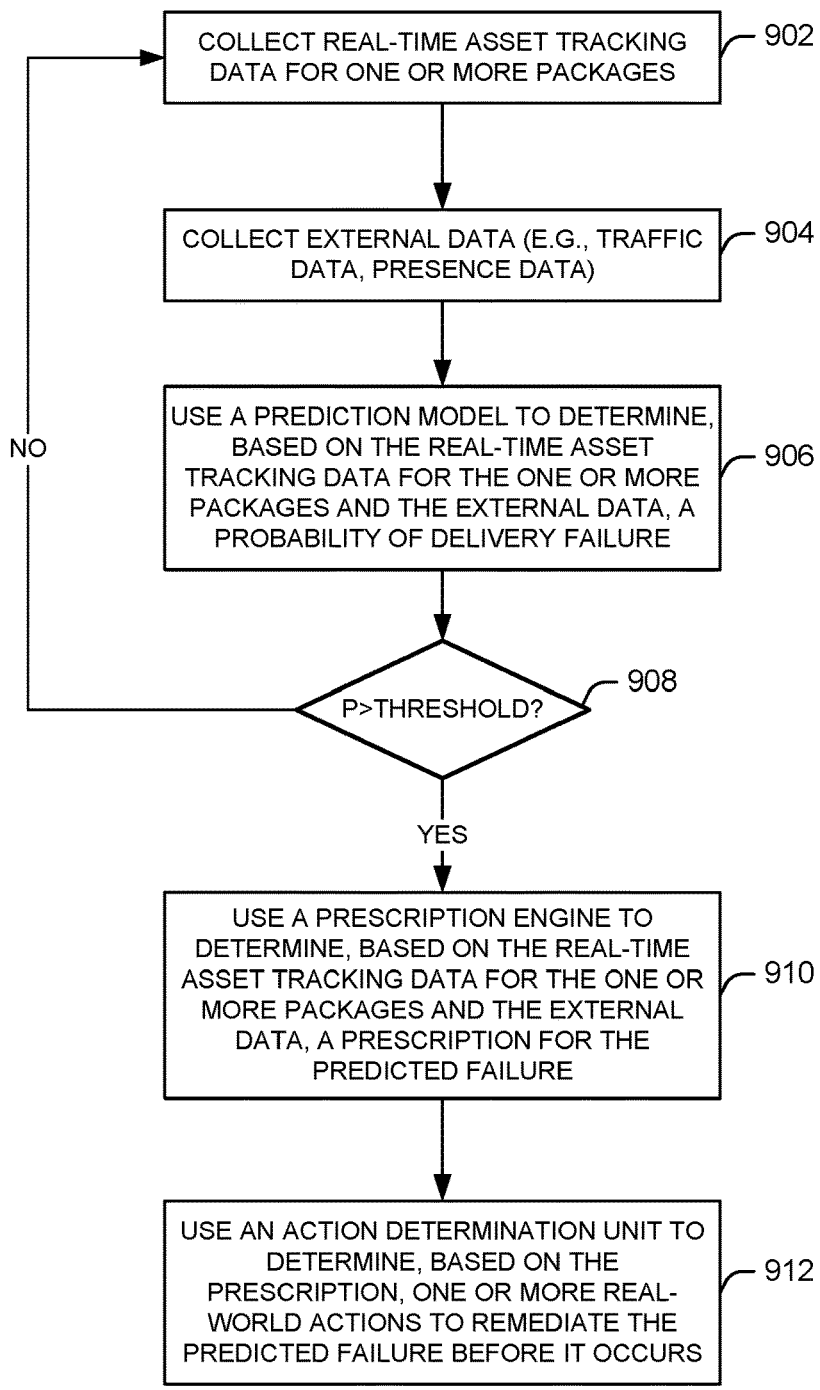
FIG. 9 shows an illustrative example of a process for real-time response strategies, in accordance with one or more example embodiments of the present disclosure.

FIG. 9 shows an illustrative example of a process for real-time response strategies, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1-8. In at least one embodiment, process 900 or a portion thereof is implemented by one or more computer systems that manage a supply chain network. Process 900 may be implemented at least in part using any suitable system, such as those described in connection with FIG. 11.

In at least one embodiment, process 900 comprises a step 902 to collect real-time asset tracking data for one or more packages. A package may refer to any suitable physical asset that may be transported through a supply chain. A package may include various types of goods. A package may include electronics, food, medical supplies, and so forth. A package may be transported across great physical distances—for example, from a manufacturing facility to an end user. While in transportation, storage, etc., the package may be subject to various environmental events or conditions that may result in the package being damaged, lost, or otherwise rendered unsatisfactory for its intended use. In some cases, a single tracking device may be used to track multiple packages. In some cases, a single package is monitored using multiple tracking devices. In various embodiments, multiple packages are shipped together, which allows for better determination of failures—for example, if N packages are being made together and only of them is overheating, it may suggest that the problem is local to a specific package. However, if all N packages are subject to overheating, it may indicate an environmental problem.

In at least one embodiment, process 900 comprises a step 904 to collect external data. In various embodiments, the system may collect external data in addition to the tracking data. External data may refer to data that is collected from sources other than sensors of the tracking device. For example, traffic data or weather data may be external data that is used by a prediction model to determine a probability of failure. Traffic data may, for example, be used to determine estimates for how long a package is in transit and whether the package is expected to be delivered on time, within specifications, stolen, subject to loss, or other possible adverse outcome.

In at least one embodiment, process 900 comprises a step 906 to use a prediction model to determine, based on the real-time asset tracking data for the one or more packages and the external data, a probability of delivery failure.

Prediction model 402 may refer to hardware, software, or a combination thereof that generates predictions or inferences of a probability of failure for a package or asset given a particular state. Prediction model 402 may receive real-time tracking data 404 and real-time external data 406 as inputs and such inputs may be used to determine predicted outcome for package 408. In various embodiments, prediction model 402 is implemented as a machine-learning model that is trained on historical event data and historical outcomes. A training dataset for the machine-learning model may provide an input comprising state information to produce outputs corresponding to predicted likelihood of failure. The state information provided as input to the prediction model may comprise collected sensor data and external data (e.g., weather, traffic, presence data collected from sources external to a tracking device). The prediction model may be trained based on the classifications generated by an outcome analyzer that serves as the ground truth for the machine-learning training process. A trained prediction model may be used to generate predictions as to whether a package in transit is expected to fail, and what the probability of failure is. The probability of failure may refer to the probability of a specific mode of failure or an overall rate of failure due to any reason whatsoever. A prediction model may be implemented in any suitable manner, for example, as a machine-learning model, as a heuristics engine, as a rules-based system, and so forth. In various embodiments, a prediction model uses historical event data of successes and failures—for example, as determined by outcome analyzer (e.g., as described in connection with FIG. 2) —to determine whether a particular package or group of packages with a common trait are expected to fail at a certain rate, a mode of failure, and so forth. Different modes of failure may include on-time delivery (e.g., in the case of time-sensitive deliveries such as organ transplants or blood transfusions, the patient may be required to receive the assets by a certain delivery time and there may be little or no tolerance for late deliveries), spoilage, theft, loss, and so forth. A prediction model may receive, as inputs, real-time tracking data of an asset and real-time external data such as weather or traffic patterns and generate, as an output, a probability of failure and/or a mode of failure. The probability of failure may refer to the probability of a particular mode of failure, or may refer to the overall likelihood of failure due to any reason. A prediction model may be trained using techniques described in connection with FIG. 10.

In at least one embodiment, process 900 comprises a step 908 to determine whether p, the probability of failure, exceeds a threshold. The threshold may be a fixed or variable number. The threshold may be determined based at least in part on the value of the package, the cost of replacement, and so forth. In some cases, p refers to the overall probability of failure, whereas in other cases p may refer to the probability of a specific mode of failure. If p does not exceed the threshold, then the process may return to step 902 and the state of the package and/or external state information may be continuously collected and evaluated to ensure that the probability of failure continues to remain below the threshold as circumstances change. However, if p exceeds the threshold, then the process proceeds to step 910

In at least one embodiment, process 900 comprises a step 910 to use a remediation engine to determine, based on the real-time asset tracking data for the one or more packages and the external data, a prescription for the predicted failure. Remediation engine may refer to hardware, software, or a combination thereof that does stuff. Remediation engine may refer to a component that is used to determine which circumstance would need to change in order for the probability of failure to improve. Remediation engine may receive real-time tracking data and historical event data as inputs and such inputs may be used to determine remediation data. Remediation engine may rely on historical event data to analyze historical trends and data to identify what changes in states would, under a given set of circumstances, result in an improvement. For example, historical event data may indicate that when a particular type of temperature-sensitive package (e.g., medical supplies) is left on a loading/unloading dock for a prolonged duration of time $t_m > t_n$, that it results in spoilage of the supplies. Further, successful events may indicate that packages that were moved to a nearby freezer before $t_n$, resulted in successful deliveries that were not subject to spoilage. Remediation engine may use this historical event data to determine location-specific information that at this particular loading/unloading dock, an available remediation is cooling because historically, it was possible to have packages moved from the loading/unloading dock to the nearby freezer. Conversely, other loading/unloading docks may not have nearby freezers, meaning that the remediation engine may, for a second warehouse, not identify cooling as an available remediation if there was not any historical data to indicate such an option is available.

In at least one embodiment, process 900 comprises a step 912 to use an action determination unit to determine, based on the prescription, one or more real-world actions to remediate the predicted failure before it occurs. Action determination unit may refer to hardware, software, or a combination thereof that determines one or more actions that should be performed to cause one or more remediations to be performed. Action determination unit may receive remediation data and real-time external data as inputs and determined, based on such inputs, one or more real-world actions to reduce the probability of failure. For example, in some cases, an applicable remediation may involve moving a package from one temperature region to another temperature region (e.g., from a loading dock into a freezer). The real-world action that would realize this change may involve providing instructions to a warehouse worker a notification—such as a text message notification or an electronic message on a warehouse computer system—with instructions to the warehouse worker to move the package in the prescribed manner.

Figure 10:
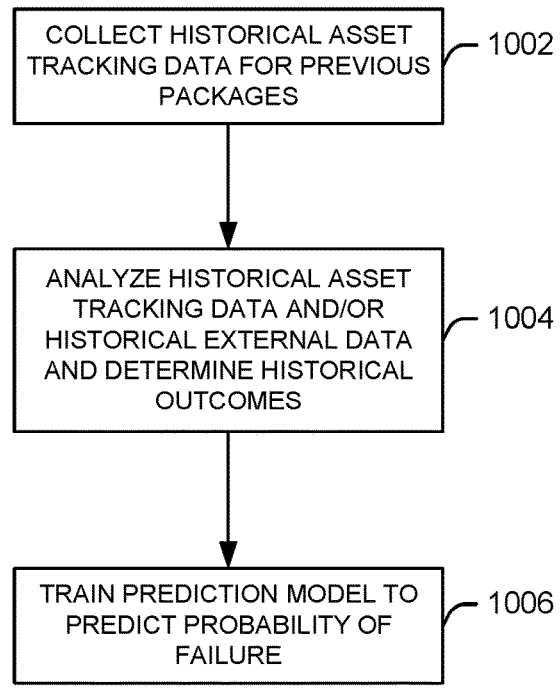
FIG. 10 shows an illustrative example of a training prediction model for real-time response strategies, in accordance with one or more example embodiments of the present disclosure.

FIG. 10 shows an illustrative example of a training a prediction model for real-time response strategies, in accordance with one or more example embodiments of the present disclosure. In at least one embodiment, some or all of the process 1000 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1000 may be implemented in the context of various systems and methods described elsewhere in this disclosure, such as those discussed in connection with FIGS. 1-8. In at least one embodiment, process 1000 or a portion thereof is implemented by one or more computer systems that manage a supply chain network. Process 1000 may be implemented at least in part using any suitable system, such as those described in connection with FIG. 11.

In at least one embodiment, process 1000 comprises a step 1002 to collect historical asset tracking data for previous packages. A data ingestion engine may be used to collect such data that is used in a training process. A data ingestion engine may be responsible for storing and providing access to tracking data for assets as they move through a supply chain environment. In some embodiments, data ingestion engine is implemented using a database system to store tracking data. Tracking data may include various information about a package collected from on board sensors, such as GPS receivers, temperature sensors, shock and impact sensors, clocks, and more. In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system, such as a machine-learning prediction model.

In at least one embodiment, process 1000 comprises a step 1004 to analyze historical asset tracking data and/or historical external data and determine historical outcomes. A training dataset for the machine-learning model may provide an input comprising state information to produce outputs corresponding to predicted likelihood of failure. The state information provided as input to the prediction model may comprise collected sensor data and external data (e.g., weather, traffic, presence data collected from sources external to a tracking device).

In at least one embodiment, process 1000 comprises a step 1006 to train a prediction model to predict probability of failure. The prediction model may be trained based on the classifications generated by an outcome analyzer that serves as the ground truth for the machine-learning training process. A trained prediction model may be used to generate predictions as to whether a package in transit is expected to fail and what the probability of failure is. The probability of failure may refer to the probability of a specific mode of failure or an overall rate of failure due to any reason whatsoever.

It is understood that the above descriptions are for purposes of illustration and are not meant to be limiting.

Figure 11:
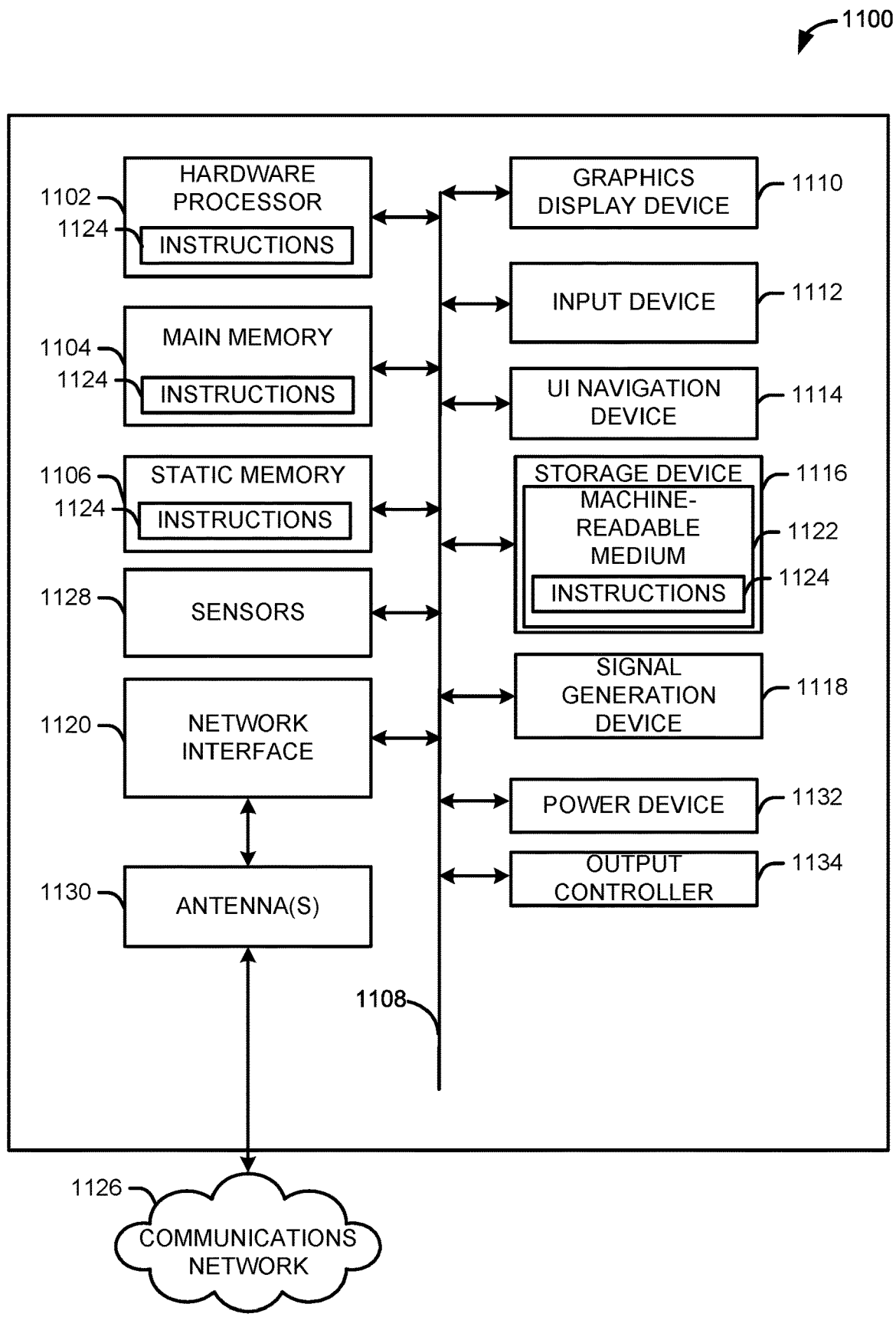
FIG. 11 illustrates a block diagram of an example machine upon which any of one or more techniques (e.g., methods) may be performed, in accordance with one or more example embodiments of the present disclosure.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. The machine 1100 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include any combination of the illustrated components. For example, the machine 1100 may include a hardware processor 1102 (e.g., a central processing unit (CPU), a graphics processing unit (GPU), a tensor processing unit (TPU) including an artificial intelligence application-specific integrated circuit (ASIC), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a data signal), a network interface device/transceiver 1120 coupled to antenna(s) 1130, and one or more sensors 1128, such as a sound detecting sensor (e.g., a microphone), accelerometers, magnetometers, location sensors, and the like. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit and/or a wireless communication receiver to receive the wireless communication signal from at least one other wireless communication unit.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams and combinations of blocks in the block diagrams and the flow diagrams, respectively, may be implemented by computer-executable program instructions. Likewise, some blocks of the block diagrams and flow diagrams may not necessarily need to be performed in the order presented or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
   obtaining, by one or more processors of a device, historical asset tracking data for previous assets;
   obtaining, by the one or more processors of the device, historical external data associated with transportation of the previous assets;
   analyzing, by the one or more processors of the device, the historical asset tracking data and the historical external data to determine historical outcomes; and
   training, by the one or more processors of the device, a machine learning model that is usable to determine a probability of failure and a mode of failure using the historical asset tracking data, the historical external data, and the historical outcomes;
   obtaining, by the one or more processors of the device, first sensor data collected from a first tracking device associated with a first asset;
   determining, by the one or more processors of the device, a first set of external data associated with the first asset;
   determining, by the one or more processors of the device, using the machine learning model, and based at least in part on the first sensor data and the first set of external data, a first probability of failure associated with a first mode of failure and a second probability of failure associated with a second mode of failure;
   re-training the machine learning model based on the first probability of failure and the second probability of failure; and
   responsive to a determination, by the one or more processors of the device, that the first probability of failure exceeds a first failure threshold and the second probability of failure is less than a second failure threshold:
      determining, by the one or more processors of the device and using the machine learning model, a first mitigation for the first mode of failure and a second mitigation for the second mode of failure that are available based at least in part on the first sensor data and the first set of external data;
      determining, by the one or more processors of the device and using the machine learning model, one or more first real-world actions corresponding to the first mitigation that, if performed, remediate the first mode of failure, and one or more second real-world actions corresponding to the second mitigation that, if performed, remediate the second mode of failure; and
      causing, by the one or more processors of the device, the one or more first real-world actions to be performed instead of the one or more second real-world actions based on the first probability of failure exceeding the first failure threshold and the second probability of failure being less than the second failure threshold.

2. The method of claim 1, wherein:
   the probability of failure and the mode of failure are determined further based at least in part on second sensor data collected from a second tracking device associated with a second asset being transported in conjunction with the first asset.

3. The method of claim 1, wherein:
   the first sensor data comprises temperature data and first location of the first asset, wherein the temperature data indicates that the first asset is exposed to temperatures in excess of a temperature threshold;
   historical tracking data indicates a second location nearby to the first location is associated with temperatures below the temperature threshold
   the first set of external data comprises presence data indicating one or more workers nearby to the location data;
   the second mitigation for the mode of failure comprises a reduction in temperatures of the first asset; and
   causing the one or more second real-world actions to be performed comprises sending a notification to one or more dock workers with instructions to move the first asset to the second location.

4. The method of claim 1, wherein:
   the mode of failure comprises theft of the first asset at a first location; and
   the one or more first real-world actions comprises re-routing delivery of the first asset to avoid the first location.

5. The method of claim 1, further comprising:
   obtaining, by the one or more processors of the device, second sensor data collected from a second tracking device associated with a second asset being transported in association with the first asset; and
   determining, by the one or more processors of the device, a common predicted failure for the first asset and the second asset.

6. A system, comprising:
   at least one processor; and
   at least one memory storing computer-executable instructions, that when executed by the at least one processor, cause the at least one processor to:
      obtain historical asset tracking data for previous assets;
      obtain historical external data associated with transportation of the previous assets;
      analyze the historical asset tracking data and the historical external data to determine historical outcomes; and
      train a machine learning model that is usable to determine a probability of failure and a mode of failure using the historical asset tracking data, the historical external data, and the historical outcomes;
      obtain first sensor data collected from a first tracking device associated with a first asset;
      determine a first set of external data associated with the first asset;
      determine, using the machine learning model and based at least in part on the first sensor data and the first set of external data, a first probability of failure associated with a first mode of failure and a second probability of failure associated with a second mode of failure;
      re-train the machine learning model based on the first probability of failure and the second probability of failure; and
      responsive to a determination that the first probability of failure exceeds a first failure threshold and the second probability of failure is less than a second failure threshold:

determine, using the machine learning model, a first mitigation for the first mode of failure and a second mitigation for the second mode of failure that are available based at least in part on the first sensor data and the first set of external data;

determine, using the machine learning model, one or more first real-world actions corresponding to the first mitigation that, if performed, remediate the first mode of failure, and one or more second real-world actions corresponding to the second mitigation that, if performed, remediate the second mode of failure; and cause the one or more first real-world actions to be performed instead of the one or more second real-world actions based on the first probability of failure exceeding the first failure threshold and the second probability of failure being less than the second failure threshold.

7. The system of claim 6, wherein:
the probability of failure and the mode of failure are determined further based at least in part on second sensor data collected from a second tracking device associated with a second asset being transported in conjunction with the first asset.

8. The system of claim 6, wherein:
the first sensor data comprises temperature data and first location of the first asset, wherein the temperature data indicates that the first asset is exposed to temperatures in excess of a temperature threshold;

historical tracking data indicates a second location nearby to the first location is associated with temperatures below the temperature threshold the first set of external data comprises presence data indicating one or more workers nearby to the location data;

the second mitigation for the mode of failure comprises a reduction in temperatures of the first asset; and causing the one or more second real-world actions to be performed comprises sending a notification to one or more dock workers with instructions to move the first asset to the second location.

9. The system of claim 6, wherein:
the mode of failure comprises theft of the first asset at a first location; and
the one or more second real-world actions comprises re-routing delivery of the first asset to avoid the first location.

10. A non-transitory computer readable medium including computer-executable instructions stored thereon, which when executed by at least one processors, cause the at least one processors to:
obtain historical asset tracking data for previous assets;
obtain historical external data associated with transportation of the previous assets;
analyze the historical asset tracking data and the historical external data to determine historical outcomes; and
train a machine learning model that is usable to determine a probability of failure and a mode of failure using the historical asset tracking data, the historical external data, and the historical outcomes;
obtain first sensor data collected from a first tracking device associated with a first asset;
determine a first set of external data associated with the first asset;

determine, using the machine learning model and based at least in part on the first sensor data and the first set of external data, a first probability of failure associated with a first mode of failure and a second probability of failure associated with a second mode of failure;

re-train the machine learning model based on the first probability of failure and the second probability of failure; and responsive to a determination that the first probability of failure exceeds a first failure threshold and the second probability of failure is less than a second failure threshold:

determine, using the machine learning model, a first mitigation for the first mode of failure and a second mitigation for the second mode of failure that are available based at least in part on the first sensor data and the first set of external data;

determine, using the machine learning model, one or more first real-world actions corresponding to the first mitigation that, if performed, remediate the first mode of failure, and one or more second real-world actions corresponding to the second mitigation that, if performed, remediate the second mode of failure; and cause the one or more first real-world actions to be performed instead of the one or more second real-world actions based on the first probability of failure exceeding the first failure threshold and the second probability of failure being less than the second failure threshold.

11. The non-transitory computer readable medium of claim 10, wherein:
the probability of failure and the mode of failure are determined further based at least in part on second sensor data collected from a second tracking device associated with a second asset being transported in conjunction with the first asset.

12. The non-transitory computer readable medium of claim 10, wherein:
the first sensor data comprises temperature data and first location of the first asset, wherein the temperature data indicates that the first asset is exposed to temperatures in excess of a temperature threshold;

historical tracking data indicates a second location nearby to the first location is associated with temperatures below the temperature threshold the first set of external data comprises presence data indicating one or more workers nearby to the location data;

the second mitigation for the mode of failure comprises a reduction in temperatures of the first asset; and causing the one or more second real-world actions to be performed comprises sending a notification to one or more dock workers with instructions to move the first asset to the second location.

13. The non-transitory computer readable medium of claim 10, wherein:
the mode of failure comprises theft of the first asset at a first location; and
the one or more second real-world actions comprises re-routing delivery of the first asset to avoid the first location.

* * * * *